US007083015B2

(12) United States Patent
Ruppert et al.

(10) Patent No.: US 7,083,015 B2
(45) Date of Patent: Aug. 1, 2006

(54) LOW FLOOR DRIVE UNIT ASSEMBLY FOR AN ELECTRICALLY DRIVEN VEHICLE

(75) Inventors: Malcolm F. Ruppert, Hebron, OH (US); Lawrence Doyle Brill, Westerville, OH (US); William Carl Sullivan, Newark, OH (US); Glen E. Swanson, Westerville, OH (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 662 days.

(21) Appl. No.: 09/781,795

(22) Filed: Feb. 12, 2001

(65) Prior Publication Data

US 2001/0004948 A1 Jun. 28, 2001

Related U.S. Application Data

(63) Continuation of application No. 08/801,531, filed on Feb. 18, 1997.

(51) Int. Cl.
*B60K 1/02* (2006.01)

(52) U.S. Cl. .................................. 180/65.1; 180/65.6
(58) Field of Classification Search .................. 475/5; 180/65.1, 65.4, 65.6, 65.5, 57, 292; 296/178, 296/64
See application file for complete search history.

(56) References Cited

U.S. PATENT DOCUMENTS

| 638,643 | A | 12/1899 | Newman et al. |
|---|---|---|---|
| 644,225 | A | 2/1900 | Elsner |
| 1,251,749 | A | 1/1918 | Cilley |
| 1,277,434 | A | 9/1918 | Leadbeater |
| 1,481,405 | A | 1/1924 | Anglada |
| 1,540,526 | A | 6/1925 | Anglada |

(Continued)

FOREIGN PATENT DOCUMENTS

| CH | 179299 | * 11/1935 | ............... 180/65.6 |
|---|---|---|---|
| CH | 679 027 A5 | 12/1991 | |
| CH | 679027 A5 | 12/1991 | |
| DE | 41 12 624 C1 | 10/1992 | |
| DE | 42 17 260 A1 | 12/1993 | |
| DE | 43 22 517 A1 | 2/1994 | |

(Continued)

OTHER PUBLICATIONS

PCT International Search Report completed Oct. 6, 1998.
Abstract (English) of FR 2507550, Van Dest et al.
Rieck G, et al.: "Focal Point: Electric Drive Systems for City Buses", Man Research Engineering Manufacturing, Man Aktiengesellschaft, Munchen, DE, 1996, pp. 4–11.
Search Report from EP 01 10 2768, dated Nov. 14, 2001, which corresponds to the subject application.
Search Report from EP 01 10 2767, dated Nov. 20, 2001, which corresponds to the subject application.

*Primary Examiner*—Frank Vanaman
(74) *Attorney, Agent, or Firm*—Carlson, Gaskey & Olds (57) ABSTRACT

An automotive vehicle drive unit assembly which is located near the sides of a vehicle includes a first driving axle shaft, a second driving axle shaft, a first gear box, a second gear box, a first electric motor, and a second electric motor. The first driving axle shaft drives a first wheel hub of the vehicle and the second driving axle shaft drives a second wheel hub. Together the first and second driving axle shafts define an axis of rotation about which the first and second wheel hubs rotate. The first gear set drives the first wheel and the second gear set drives the second wheel. A first electric motor is mounted in an angular relationship relative to the axis of rotation and drives the first gear set. A second electric motor is mounted in an angular relationship relative to the axis of rotation and drives the second gear set. A plurality of electric motors can be used to drive each wheel hub.

32 Claims, 4 Drawing Sheets

U.S. PATENT DOCUMENTS

| | | |
|---|---|---|
| 1,543,044 A | 6/1925 | Anglada |
| 1,660,669 A * | 2/1928 | Froesch ..................... 475/5 |
| 1,735,404 A | 11/1929 | Masury |
| 1,906,930 A | 5/1933 | Ledwinka |
| 2,093,859 A | 9/1937 | Austin |
| 2,462,574 A | 2/1949 | Wallace |
| 2,589,863 A | 3/1952 | Quartullo |
| 3,161,083 A | 12/1964 | Roe |
| 3,186,506 A | 6/1965 | Leach et al. |
| 3,812,928 A | 5/1974 | Rockwell et al. |
| 3,930,551 A | 1/1976 | Cragg |
| 3,933,217 A | 1/1976 | Eichinger |
| 4,089,384 A | 5/1978 | Ehrenberg |
| 4,146,104 A | 3/1979 | Leembruggen |
| 4,270,622 A | 6/1981 | Travis |
| 4,330,045 A | 5/1982 | Myers |
| 4,469,369 A | 9/1984 | Belik et al. |
| 4,534,442 A | 8/1985 | Botar |
| 4,658,189 A | 4/1987 | Trusock |
| 4,930,590 A | 6/1990 | Love et al. |
| 5,222,568 A | 6/1993 | Higasa |
| 5,238,454 A | 8/1993 | Schmidt |
| 5,419,406 A * | 5/1995 | Kawamoto et al. ........ 180/65.6 |
| 5,435,793 A | 7/1995 | Varela |
| 5,465,806 A * | 11/1995 | Higasa et al. ............... 180/65.1 |
| 5,853,059 A * | 12/1998 | Goertzen et al. .......... 180/65.6 |

FOREIGN PATENT DOCUMENTS

| | | | |
|---|---|---|---|
| EP | 0 417 326 A1 | 3/1991 | |
| FR | 2 507 550 | 12/1982 | |
| GB | 339241 | * 11/1930 | ................ 180/65.6 |
| GB | 454464 | * 10/1936 | ................ 180/65.5 |
| GB | 502313 | 3/1939 | |
| GB | 1 303 615 | 1/1973 | |
| GB | 2176852 A | 1/1987 | |
| SE | 85880 | * 3/1936 | ................ 180/65.6 |
| WO | 90/11905 | * 10/1990 | ................ 180/65.5 |
| WO | WO 97/09192 A1 | 3/1997 | |

* cited by examiner

Fig - 7

LOW FLOOR DRIVE UNIT ASSEMBLY FOR AN ELECTRICALLY DRIVEN VEHICLE

This application is a continuation of Ser. No. 08/801,531 file on Feb. 18, 1997.

BACKGROUND OF THE INVENTION

This invention relates to a unique drive arrangement for electrically driving the wheels of a vehicle in such a way that the floor of the vehicle may be lower than was the case in the prior art.

Mass transit vehicles, such as a bus or trolley car, typically have seats aligned at the lateral sides of the vehicle, with a central aisle extending along the vehicle. The seats are typically at a higher vertical location than the aisle, and thus cover the wheels. It would be desirable to have the aisle positioned relatively low to the ground. This would provide increased passenger space within the body of the vehicle, and may allow the designer to reduce the overall height of the mass transit vehicle. Other advantages to having a lower floor position include improved handicapped access and greater ease in the loading and unloading of passengers.

Mass transit vehicles typically have several axles which support and drive or steer the vehicle. If the axle is a driving axle, then electric motors can be used to generate torque to drive the wheels. In a typical configuration, a centrally located electric motor drives two opposed wheels at the sides of the vehicle by way of a conventional axle. Usually, transmissions or drive shafts extend from the central motor to the axle.

In the prior art, there are relatively large motor, transmission, or axle elements directly below the center of the vehicle. The aisle is typically in the center of the vehicle and normally goes over the axle, thus requiring the floor of the aisle to be relatively high. One known bus moves the floor up by steps over the axle. It is undesirable, however, to have passengers climb steps to reach the aisle and seating areas.

SUMMARY OF THE INVENTION

The subject invention relates to an automotive vehicle drive unit assembly which includes a first driving axle and a second driving axle which together define an axis of rotation. The drive unit assembly further includes a first wheel hub and a second wheel hub which are driven about the axis of rotation. A first gear set drives the first wheel hub and a second gear set drives the second wheel hub. A first electric motor is mounted at an angle relative to the axis of rotation of the first driving axle and drives the first gear set, and a second electric motor is mounted at an angle relative to the axis of rotation of the second driving axle and drives the second gear set.

This invention improves packaging and increases passenger compartment size by moving the electric motors to the sides of the vehicle. This allows the interior vehicle floor to be lowered between the motors resulting in improved utilization of the passenger compartment. Also, the flexibility of mounting the electric motors at various angles with respect to the axis of rotation of the first and second driving axles results in flexible packaging designs for other vehicle components.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF A PREFERRED EMBODIMENT

Figure 1:
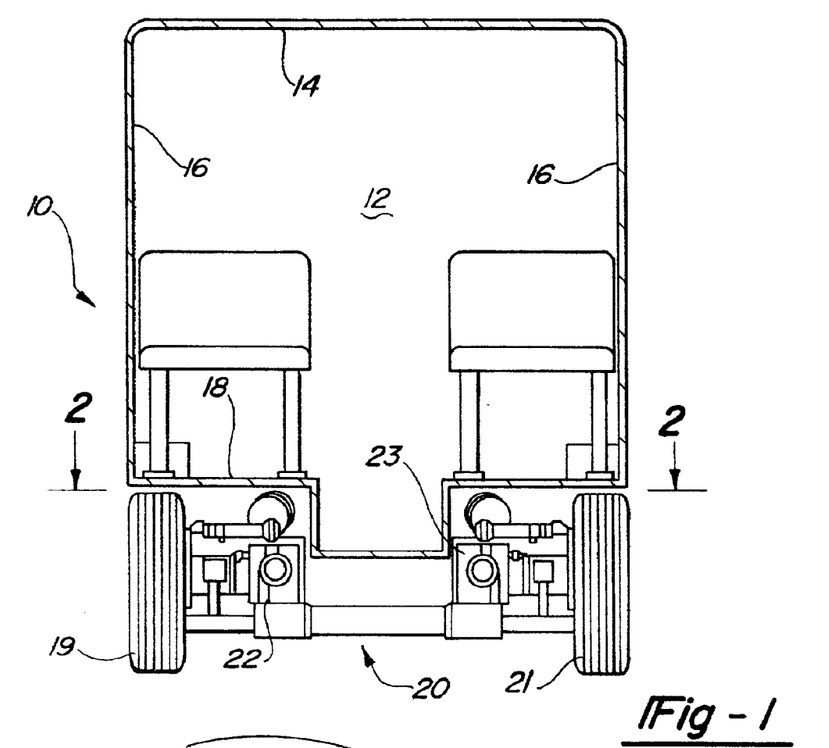
FIG. 1 is a cross sectional view of a vehicle incorporating the subject invention.

Referring to the Figures, wherein like numerals indicate like or corresponding parts throughout the several views, an automotive vehicle is shown generally at 10. As shown in FIG. 1, automotive vehicle 10 includes a passenger compartment 12 defined by a roof 14, two side walls 16, and a vehicle floor 18. A pair of wheels 19,21 are driven by an automotive vehicle drive unit assembly, generally shown at 20, which has a first unit 22 and a second unit 23. It should be understood that vehicle 10 is typically provided with a pair of drive units and several pairs of wheels.

Figure 2A:
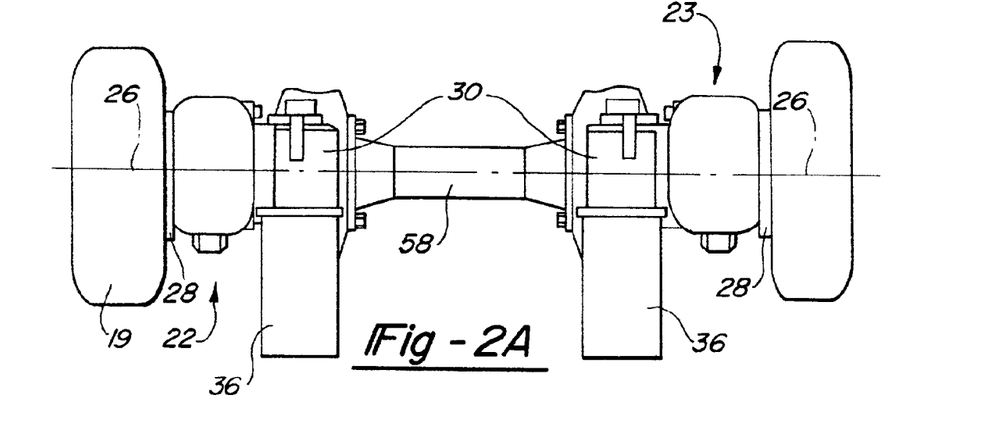
FIG. 2A is a cross sectional view taken along line 2—2 of FIG. 1, showing a first electric motor arrangement.
Figure 3:
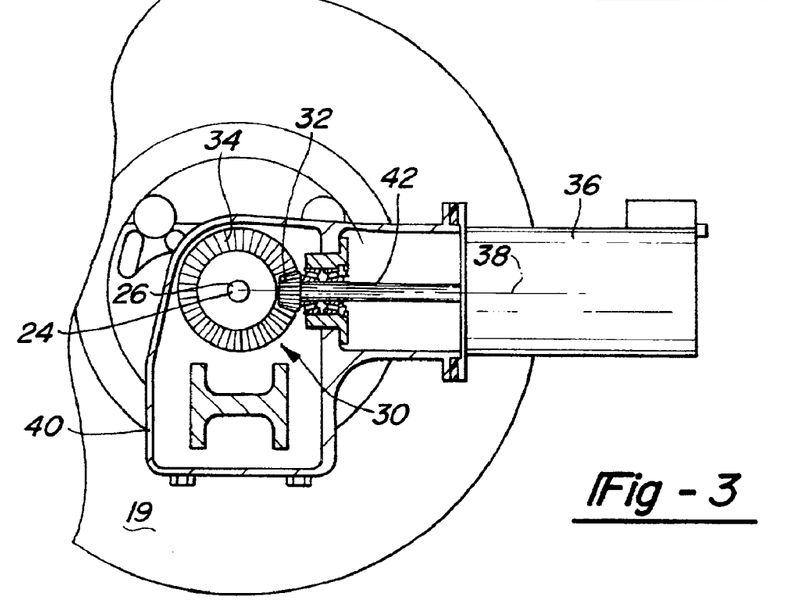
FIG. 3 is a fragmentary view from the inside of the left wheel hub as shown in FIG. 2, partially broken away and in cross section, and showing a first embodiment of an electric motor arrangement.

As shown in FIG. 2A, the first unit and second units 22 and 23 define an axis of rotation 26. As shown in FIG. 3, a first driving axle shaft 24 drives a first wheel hub 28 which revolves about the axis 26 of the first driving axle shaft 24.

A first gear set 30, located adjacent to the first wheel 19, is comprised of a pinion gear 32 and a ring gear 34 which together drive the first wheel hub 28. A first electric motor 36, defining a motor axis of rotation 38, is mounted at a non-parallel angle relative to the axis of rotation 26 of the first driving axle shaft 24. The first electric motor 36 is shown mounted in a horizontal position such that the motor axis of rotation 38 is parallel to the vehicle floor 18 and is perpendicular to the axis of rotation 26 of the first driving axle shaft 24.

As shown in FIG. 2A, drive unit assembly 20 further includes a second unit 23 comprising a second driving axle shaft 24, a second wheel hub 28, a second gear set 30, and a second electric motor 36. It is understood that the second unit 23 is a mirror image of the first unit 22. A beam 58 provides a fixed housing extending between the first 22 and second 23 units.

Figure 2B:
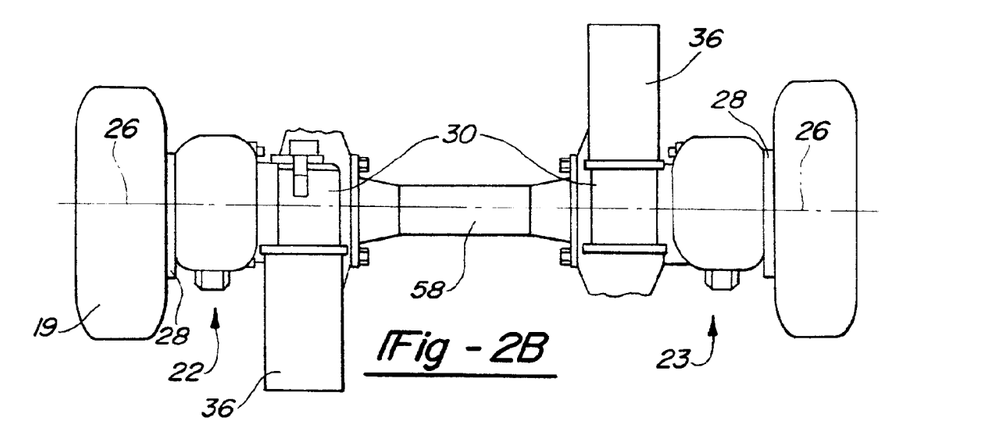
FIG. 2B is a view like FIG. 2A, but showing an alternative electric motor arrangement.

The first 36 and second 36 electric motors can be mounted in various different positions relative to each other. As shown in FIG. 2A, the first 36 and second 36 electric motors can be mounted in a generally horizontal position with both electric motors 36 extending forwardly from the beam 58. Where packaging would allow, the electric motors 36 can also be mounted such that they both extend rearwardly from the beam 58. As shown in FIG. 2B, the first 36 and second 36 electric motors can be mounted in a generally horizontal position with the first electric motor 36 extending in a forwardly direction relative to beam 58 while the second electric motor 36 extends in a rearwardly direction relative to beam 58. Arranging the configuration so that one electric motor 36 extends forwardly while the other electric motor 36 extends rearwardly can resolve electric motor weight balance issues that arise when both motors extend in the same direction from the beam 58.

Figures 4, 5:
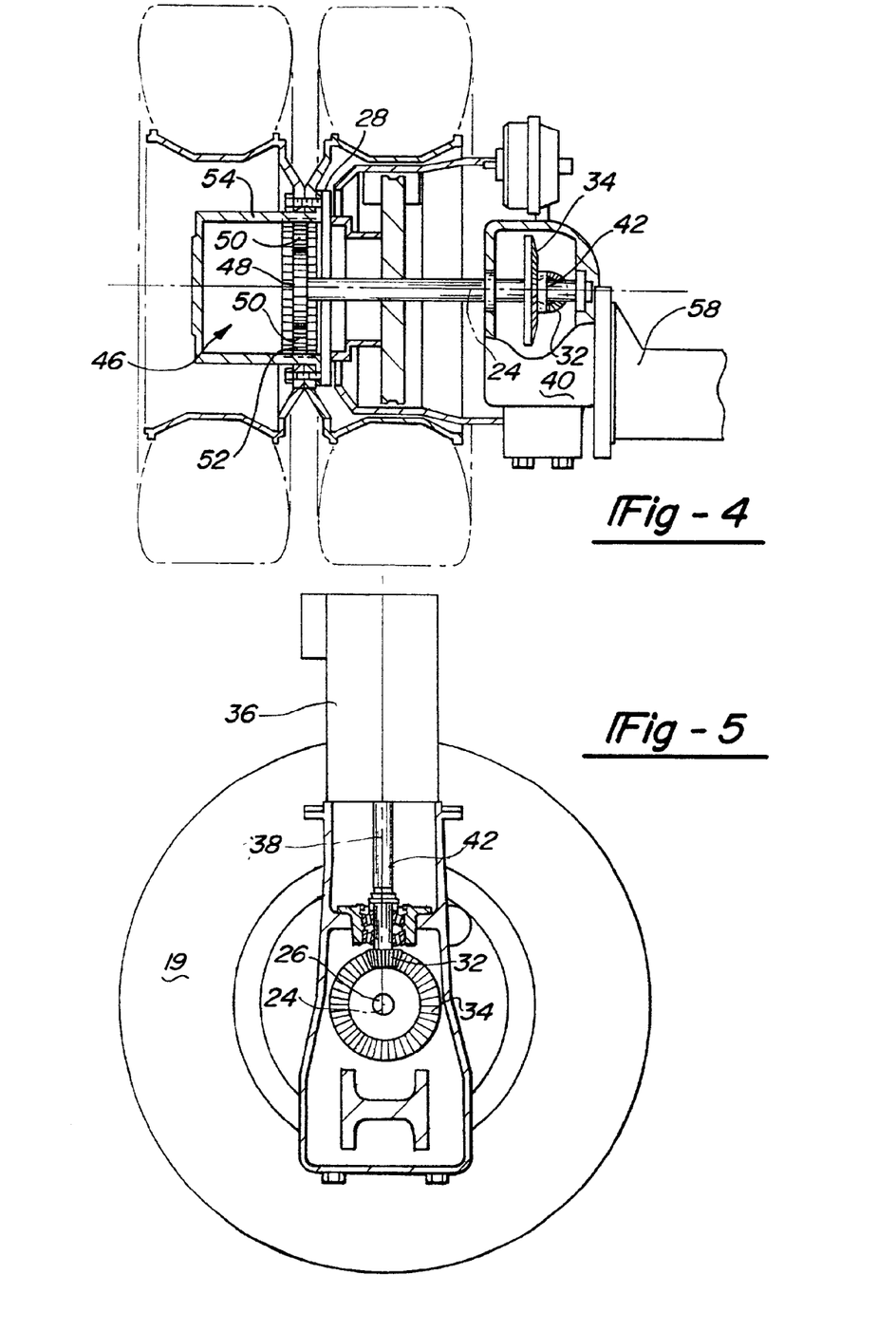
FIG. 4 is a cross section view from the front of the left wheel as shown in FIG. 3, and showing the first embodiment of an electric motor mounting arrangement.
FIG. 5 is a view like FIG. 3 but showing an alternative electric motor mounting arrangement.

As can be seen in FIGS. 3 and 4, a first gear box 40 houses the first gear set 30 and is rigidly connected to the first electric motor 36. A motor drive shaft 42 extends from the electric motor 36, along the motor axis of rotation 38, and drives the pinion gear 32. The pinion gear 32 meshes with the ring gear 34 which revolves about the axis 26 of the driving axle shaft 24. As the ring gear rotates, it drives the driving axle shaft 24 which turns the wheel hub 28. As can be seen in FIG. 4, gear box 40 is fixed to beam 58.

Figure 8:
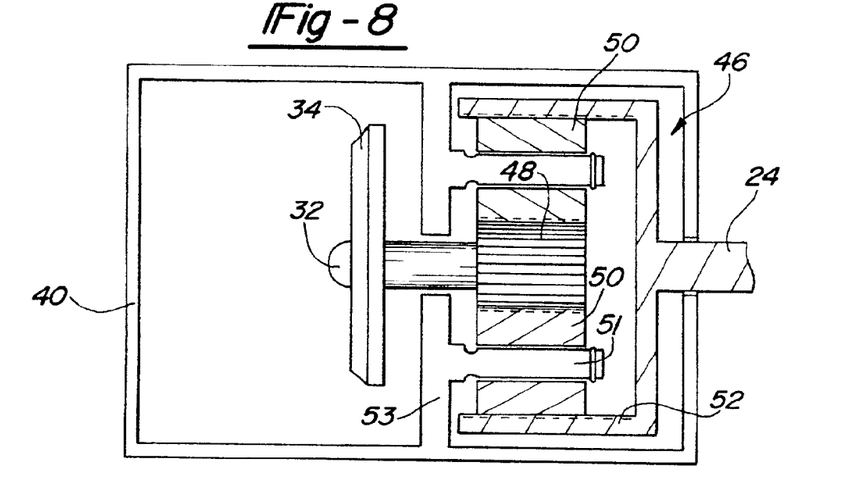
FIG. 8 is a cross sectional view of a gear box showing an alternative embodiment incorporating a planetary gear set.

A planetary gear set, shown generally at 46 in FIG. 4, can be used to achieve greater overall gear reduction. The planetary gear set 46 can either be located adjacent to the wheel hub 28 or can be incorporated into the gear box 40. The planetary gear set 46 shown in FIG. 4 is located adjacent to the first wheel hub 28 and is driven by the first driving axle shaft 24. The planetary gear set 46 shown in FIG. 8 is incorporated into the gear box 40. Regardless of its location, the planetary gear set 46 includes a sun gear 48, planet gears 50, and a ring gear hub 52. Each planet gear 50 is attached to a single planetary spider 53 by a corresponding planet pin 51, thus forming a planet gear assembly, as shown in the enlarged view of the planetary gear set 46 in FIG. 8. The planet gear assembly is inserted into the ring gear hub 52 such that the teeth of the planet gears 50 mesh with the teeth of the ring gear hub 52.

In a typical configuration there are three planet gears 50 in a planet gear assembly but it is understood that a different number of planet gears 50 can be used. When the planetary gear set 46 is located adjacent to the wheel hub 28, as shown in FIG. 4, the sun gear 48 is attached to and driven by the first driving axle shaft 24. As the sun gear 48 rotates, it meshes simultaneously with each of the planet gears 50 in the planet gear assembly. The planet gears 50 mesh with the ring gear hub 52 which results in the turning of the first wheel hub 28. The entire planetary gear set 46 is housed within a planetary hub 54 located adjacent to the first wheel hub 28. It is understood that the drive unit assembly 20 does not require a planetary gear set 46 for operation. The planetary gear set 46 is an optional feature of the drive unit assembly 20.

As shown in FIG. 8, the planetary gear set 46 can also be incorporated into the gear box 40 instead of being located adjacent to the wheel hub 28. Incorporating the planetary gear set 46 into the gear box 40 is a unique location for the planetary gear set 46. Typically, this location has been used by a differential which includes a ring gear and a pinion gear which drive axle shafts which in turn drive the wheels. With independent electric motors 36 there is no need for a differential or for any direct mechanical link between opposing wheels. By incorporating the planetary gear set 46 into the gear box 40, the need for a planetary hub 54 is eliminated which decreases the vehicle weight, gives a broader selection of wheel equipment and wheel end features, and reduces overall cost.

Figure 6:
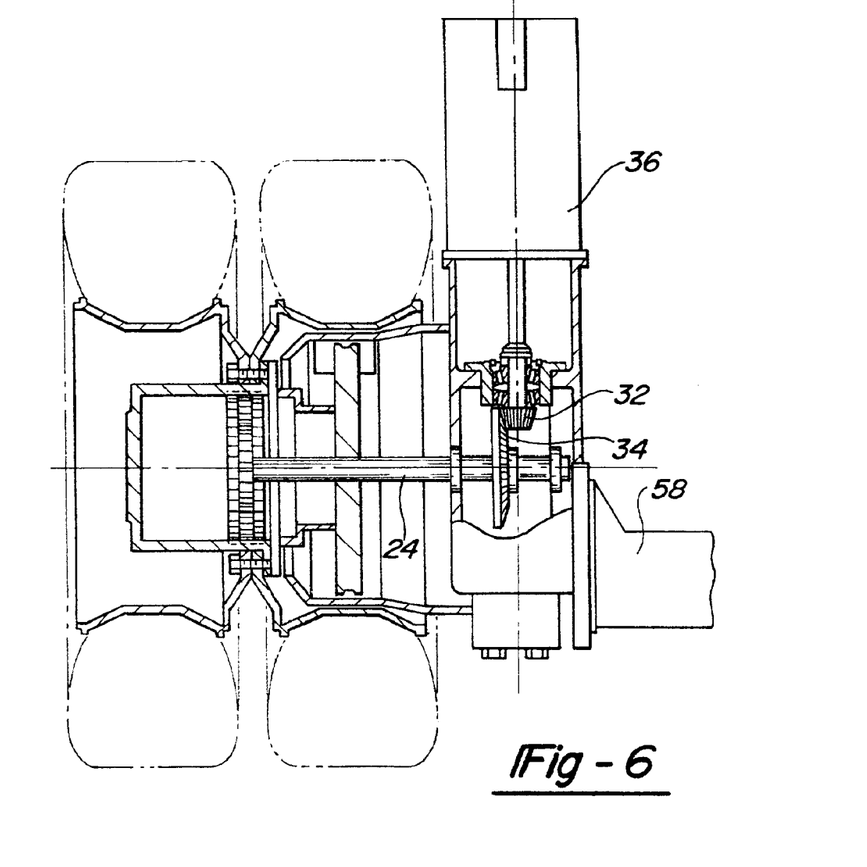
FIG. 6 is a view like FIG. 4 but showing the alternative electric motor mounting arrangement.

FIGS. 5 and 6 show an alternate embodiment of the mounting arrangement for the first electric motor 36. The first electric motor 36 is shown mounted in a vertical position such that the motor axis of rotation 38 is perpendicular to the vehicle floor 18 and is perpendicular to the axis of rotation 26 of the first driving axle shaft 24. In a typical configuration, the first electric motor 36 is mounted either in a horizontal or vertical position. However, the electric motor 36 can be mounted at any angle with respect to the vehicle floor 18 and the axis of rotation 26 of the first driving axle shaft 24.

Figure 7:
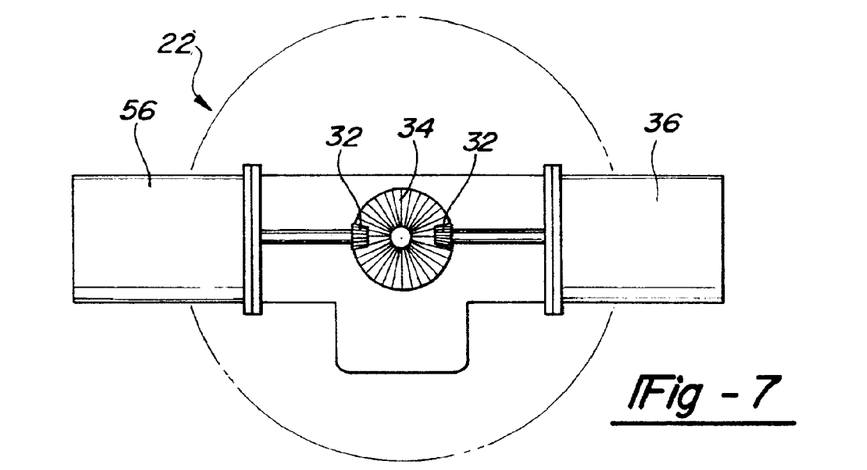
FIG. 7 is a view like FIG. 3 but showing an additional electric motor.

FIG. 7 shows an alternate embodiment of the drive unit assembly 20 in which the first unit 22 includes a third electric motor 56, in parallel driving relationship with the first electric motor 36. The third electric motor 56 is also used to drive the first gear set 30. The second unit 23 is a mirror image of the first unit 22 and includes a fourth electric motor 56, in parallel driving relationship with the second electric motor 36. The fourth electric motor 56 is use to drive the second gear set 30. The use of a third 56 and fourth electric motor 56, where packaging space is available, allows smaller gears and motors to be used, thus reducing the necessary size for the system.

With the present invention, the benefits as shown in particular in FIG. 1 are achieved. By mounting the motors at the sides of the vehicle, the center of the vehicle floor may be lowered significantly than compared to the prior art. In addition, since the motors themselves are connected to drive the wheels to a non-parallel angle, they do not extend towards the center of the vehicle from the wheel for any undue amount. Thus, the lower floor can begin at a laterally outer position. If the motors extended on an axis parallel to the axis of the wheel, the motor would require a higher floor for more of the lateral width of the vehicle.

The invention has been described in an illustrative manner, and it is to be understood that the terminology which has been used is intended to be in the nature of words of description rather than of limitation.

Another method of mounting the motors for the present invention is disclosed in U.S. Pat. No. 5,924,504 entitled "Suspension Drive Unit Assembly for An Electronically Driven Vehicle." Another mounting of the motor relative to the axle of the wheel hub is disclosed in U.S. Pat. No. 5,878,830 entitled "Space Saving Connection for Electric Drive Motor to Wheel Hub."

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

We claim:
1. An automotive vehicle drive unit assembly comprising:
  first and second driving axle shafts being co-linear and defining a lateral axis of rotation;
  first and second wheel hubs driven by said first and second driving axle shafts respectively about said lateral axis of rotation;
  a first gear set for driving said first wheel hub;
  a second gear set for driving said second wheel hub;
  a first electric motor for driving said first gear set and defining a first longitudinal axis of rotation that intersects said lateral axis of rotation;

a second electric motor for driving said second gear set and defining a second longitudinal axis of rotation that intersects said lateral axis of rotation and is spaced apart from said first longitudinal axis of rotation; and first and second planetary gear sets driven by said first and second gear sets about said lateral axis of rotation.

2. The assembly as set forth in claim 1 wherein said first and second planetary gear sets are incorporated into said first and second wheel hubs.

3. The assembly as set forth in claim 1, including a first gearbox for housing said first gear set and a second gearbox for housing said second gear set, said first and second gearboxes being mounted to said first and second electric motors respectively and wherein said first and second planetary gear sets are incorporated into said first and second gearboxes.

4. The assembly as set forth in claim 1, wherein said first gear set includes a first pinion gear in driving engagement with a first ring gear mounted for rotation with said first wheel hub and said second gear set includes a second pinion gear in driving engagement with a second ring gear mounted for rotation with said second wheel hub.

5. The assembly as set forth in claim 4, wherein said first planetary gear set includes a first sun gear mounted for rotation with said first ring gear and a first plurality of planet gears in meshing engagement with a first planetary ring gear hub; and said second planetary gear set includes a second sun gear mounted for rotation with said second ring gear and a second plurality of planet gears in meshing engagement with a second planetary ring gear hub.

6. The assembly as set forth in claim 1, wherein said first and second longitudinal axes of rotation are perpendicular to said lateral axis of rotation.

7. The assembly as set forth in claim 1, wherein said first and second electric motors are supported by a common axle housing extending along said lateral axis of rotation.

8. The assembly as set forth in claim 1, wherein said first and second electric motors are mounted at a 90 degree angle extending generally vertically and upwardly from said lateral axis of rotation.

9. An automotive vehicle drive unit assembly comprising:

first and second driving axle shafts being co-linear and defining a lateral axis of rotation;

first and second wheel hubs driven by said first and second driving axle shafts respectively about said lateral axis of rotation to move a vehicle along a ground surface in a direction transverse to said lateral axis of rotation;

a first gear set for driving said first wheel hub wherein said first gear set includes a first pinion gear in driving engagement with a first ring gear mounted for rotation with said first wheel hub;

a second gear set for driving said second wheel hub wherein said second gear set includes a second pinion gear in driving engagement with a second ring gear mounted for rotation with said second wheel hub;

a first electric motor for driving said first gear set and defining a first longitudinal axis of rotation that is transverse to said lateral axis of rotation;

a second electric motor for driving said second gear set and defining a second longitudinal axis of rotation that is transverse to said lateral axis of rotation and spaced apart from said first longitudinal axis of rotation; and first and second planetary gear sets driven by said first and second gear sets about said lateral axis of rotation wherein said first planetary gear set includes a first sun gear mounted for rotation with said first ring gear and a first plurality of planet gears in meshing engagement with a first planetary ring gear hub and wherein said second planetary gear set includes a second sun gear mounted for rotation with said second ring gear and a second plurality of planet gears in meshing engagement with a second planetary ring gear hub wherein said first planetary ring gear hub drives said first wheel hub and said second planetary ring gear hub drives said second wheel hub.

10. An automotive vehicle drive unit assembly comprising:

first and second driving axle shafts being co-linear and defining a lateral axis of rotation;

first and second wheel hubs driven by said first and second driving axle shafts respectively about said lateral axis of rotation to move a vehicle alone a ground surface in a direction transverse to said lateral axis of rotation;

a first gear set for driving said first wheel hub;

a second gear set for driving said second wheel hub;

a first electric motor for driving said first gear set and defining a first longitudinal axis of rotation that is transverse to said lateral axis of rotation;

a second electric motor for driving said second gear set and defining a second longitudinal axis of rotation that is transverse to said lateral axis of rotation and spaced apart from said first longitudinal axis of rotation; and first and second planetary gear sets driven by said first and second gear sets about said lateral axis of rotation wherein said first planetary gear set includes a first sun gear mounted for rotation with said first ring gear and a first plurality of planet gears in meshing engagement with a first planetary ring gear hub and wherein said second planetary gear set includes a second sun gear mounted for rotation with said second ring gear and a second plurality of planet gears in meshing engagement with a second planetary ring gear hub wherein said first planetary ring gear hub drives said first driving axle shaft and said second planetary ring gear hub drives said second driving axle shaft.

11. The assembly as set forth in claim 10, wherein said first planetary ring gear hub is integrally formed with said first driving axle shaft as one piece and said second planetary ring gear hub is integrally formed with said second driving axle shaft as one piece.

12. The assembly as set forth in claim 11, wherein said first gear set and said first planetary gear set are housed within a first common gearbox mounted to said first electric motor, and said second gear set and said second planetary gear set are housed within a second common gearbox mounted to said second electric motor.

13. An automotive vehicle drive unit assembly comprising:

first and second driving axle shafts being co-linear and defining a lateral axis of rotation;

first and second wheel hubs driven by said first and second driving axle shafts respectively about said lateral axis of rotation to move a vehicle along a ground surface in a direction transverse to said lateral axis of rotation;

a first gear set for driving said first wheel hub;

a second gear set for driving said second wheel hub;

a first electric motor for driving said first gear set and defining a first longitudinal axis of rotation that is transverse to said lateral axis of rotation;

a second electric motor for driving said second gear set and defining a second longitudinal axis of rotation that is transverse to said lateral axis of rotation and spaced apart from said first longitudinal axis of rotation; and first and second planetary gear sets driven by said first and second gear sets about said lateral axis of rotation wherein one of said first and second electric motors is mounted at a 90 degree angle extending generally horizontally and forwardly relative to said lateral axis of rotation and the other of said first and second electric motors is mounted at a 90 degree angle extending generally horizontally and rearwardly relative to said lateral axis of rotation.

14. An automotive vehicle drive unit assembly comprising:

first and second driving axle shafts being co-linear and defining a lateral axis of rotation;

first and second wheel hubs driven by said first and second driving axle shafts respectively about said lateral axis of rotation to move a vehicle along a ground surface in a direction transverse to said lateral axis of rotation;

a first gear set for driving said first wheel hub;

a second gear set for driving said second wheel hub;

a first electric motor for driving said first gear set and defining a first longitudinal axis of rotation that is transverse to said lateral axis of rotation;

a second electric motor for driving said second gear set and defining a second longitudinal axis of rotation that is transverse to said lateral axis of rotation and spaced apart from said first longitudinal axis of rotation; and first and second planetary gear sets driven by said first and second gear sets about said lateral axis of rotation wherein said first and second electric motors are mounted at an angle extending generally horizontally and rearwardly from said lateral axis of rotation.

15. An automotive vehicle drive unit assembly comprising:

first and second driving axle shafts being co-linear and defining a lateral axis of rotation;

first and second wheel hubs driven by said first and second driving axle shafts respectively about said lateral axis of rotation;

a first gear set for driving said first wheel hub;

a second gear set for driving said second wheel hub;

first and second planetary gear sets driven by said first and second gear sets about said lateral axis of rotation;

a first electric motor for driving said first gear set and defining a first longitudinal axis of rotation that is transverse to said lateral axis of rotation;

a second electric motor for driving said second gear set and defining a second longitudinal axis of rotation that is transverse to said lateral axis of rotation and spaced apart from said first longitudinal axis of rotation;

a third electric motor in parallel driving relationship with said first electric motor to drive said first gear set; and a fourth electric motor in parallel driving relationship with said second electric motor to drive said second gear set wherein said first and third electric motors drive said first gear set and said second and fourth electric motors drive said second gear set independently from each other.

16. The assembly as set forth in claim 15, wherein said first and said third electric motors extend radially from said first gear set, and said second and said fourth electric motors extend radially from said second gear set.

17. The assembly as set forth in claim 16, wherein said first gear set includes a first pinion gear driven by said first electric motor and a second pinion gear driven by said third electric motor, said first and second pinion gears for simultaneously driving a first ring gear and wherein said second gear set includes a third pinion gear driven by said second electric motor and a fourth pinion gear driven by fourth electric motor, said third and fourth pinion gears for simultaneously driving a second ring gear.

18. Assembly as set forth in claim 17, wherein said first gear set is housed within a first gearbox mounted to said first and third electric motors and said second gear set is housed within a second gearbox mounted to said second and fourth electric motors.

19. The assembly as set forth in claim 15, wherein said first gear set is housed within a first gearbox mounted to said first and third electric motors and said second gear set is housed within a second gearbox mounted to said second and fourth electric motors.

20. The assembly as set forth in claim 19, wherein said first gear set includes a first pinion gear in driving engagement with a first ring gear mounted for rotation with said first wheel hub and said second gear set includes a second pinion gear in driving engagement with a second ring gear mounted for rotation with said second wheel hub.

21. The assembly as set forth in claim 20, wherein said first planetary gear set includes a first sun gear mounted for rotation with said first ring gear and a first plurality of planet gears in meshing engagement with a first planetary ring gear hub and said second planetary gear set includes a second sun gear mounted for rotation with said second ring gear and a second plurality of planet gears in meshing engagement with a second planetary ring gear hub.

22. The assembly as set forth in claim 15 wherein said third electric motor defines a third longitudinal axis of rotation that is co-linear with said first longitudinal axis of rotation and said fourth electric motor defines a fourth axis of rotation that is co-linear with said second longitudinal axis of rotation.

23. A vehicle comprising:

a vehicle body extending between lateral sides, passenger seats being mounted adjacent each of said lateral sides, a floor defined beneath said passenger seats, an aisle defined between said passenger seats, and said floor also extending beneath said aisle;

at least one driving axle for driving a pair of laterally spaced wheels including a first drive axle shaft associated with a first wheel of said pair of laterally spaced wheels, and a second drive axle shaft associated with a second wheel of said pair of laterally spaced wheels, said first and second drive axle shafts defining a lateral axis of rotation;

a first gear set and a second gear set for driving said first and second wheels;

a first planetary gear set and a second planetary gear set driven by said first and second gear sets about said lateral axis of rotation;

a first electric motor mounted at a non-parallel angle relative to said lateral axis of rotation for driving said first gear set, and a second electric motor mounted at a non-parallel angle relative to said lateral axis of rotation and operatively connected to drive said second gear set wherein said first and second electric motors drive said first and second planetary gear sets to move a vehicle along a ground surface in a direction transverse to said lateral axis of rotation; and said first and second electric motors being mounted adjacent to said first and second wheels at a vertical position which is higher than a vertical position of the floor of said aisle.

24. The vehicle as set forth in claim 23, including a third electric motor mounted in parallel driving relationship with said first electric motor to assist in driving said first gear set and a fourth electric motor mounted in parallel driving relationship with said second electric motor to assist in driving said second gear set.

25. The vehicle as set forth in claim 24, wherein said first planetary gear set is driven by said first and third electric motors via said first gear set for speed reduction at said first wheel and said second planetary gear set is driven by said second and fourth electric motors via said second gear set for speed reduction at said second wheel.

26. The vehicle as set forth in claim 23 including a first motor output shaft rotatable about a first longitudinal axis of rotation and directly coupled to said first gear set and a second motor output shaft rotatable about a second longitudinal axis of rotation and directly coupled to said second gear set such that said first and second longitudinal axes of rotation intersect said lateral axis of rotation.

27. An automotive vehicle drive unit assembly comprising:
first and second driving axle shafts being co-linear and defining a lateral axis of rotation;
first and second wheel hubs driven by said first and second driving axle shafts respectively about said lateral axis of rotation to move a vehicle along a ground surface in a direction transverse to said lateral axis of rotation;
a first gear set for driving said first wheel hub;
a second gear set for driving said second wheel hub;
a first electric motor for driving said first rear set and defining a first longitudinal axis of rotation that is transverse to said lateral axis of rotation;
a second electric motor for driving said second gear set and defining a second longitudinal axis of rotation that is transverse to said lateral axis of rotation and spaced apart from said first longitudinal axis of rotation;
first and second planetary gear sets driven by said first and second gear sets about said lateral axis of rotation;
a first motor output shaft rotatable about said first longitudinal axis of rotation and a second motor output shaft rotatable about said second longitudinal axis of rotation;
said first gear set including a first pinion gear driven by said first motor output shaft and mounted for rotation about said first longitudinal axis of rotation and a first ring gear driven by said first pinion gear about said lateral axis of rotation;
said first planetary gear set including a first sun gear coupled for rotation with said first ring gear about said lateral axis of rotation;
said second gear set including a second pinion gear driven by said second motor output shaft and mounted for rotation about said second longitudinal axis of rotation and a second ring gear driven by said second pinion gear about said lateral axis of rotation; and
said second planetary gear set includes a second sun gear coupled for rotation with said second ring gear about said lateral axis of rotation.

28. The assembly as set forth in claim 27 wherein said first sun gear is directly coupled to said first ring gear and said second sun gear is directly coupled to said second ring gear.

29. The assembly as set forth in claim 27 wherein said first driving axle shaft is driven by said first ring gear and said first sun gear is driven by said first driving axle shaft and said second driving axle shaft is driven by said second ring gear and said second sun gear is driven by said second driving axle shaft.

30. The assembly as set forth in claim 27 wherein said first planetary gear set is positioned adjacent to said first motor output shaft and between said first ring gear and said first driving axle shaft and wherein said second planetary gear set is positioned adjacent to said second motor output shaft and between said second ring gear and said second driving axle shaft.

31. The assembly as set forth in claim 27 wherein said first planetary gear set is positioned adjacent to said first wheel hub at a distal end of said first driving axle shaft and said second planetary gear set is positioned adjacent to said second wheel hub at a distal end of said second driving axle shaft.

32. An automotive vehicle drive unit assembly comprising:
first and second driving axle shafts being co-linear and defining a lateral axis or rotation;
first and second wheel hubs driven by said first and second driving axle shafts respectively about said lateral axis of rotation to move a vehicle along a ground surface in a direction transverse to said lateral axis of rotation;
a first gear set for driving said first wheel hub;
a second gear set for driving said second wheel hub;
a first electric motor for driving said first gear set and defining a first longitudinal axis of rotation that is transverse to said lateral axis of rotation;
a second electric motor for driving said second gear set and defining a second longitudinal axis of rotation that is transverse to said lateral axis of rotation and spaced apart from said first longitudinal axis of rotation;
first and second planetary gear sets driven by said first and second gear sets about said lateral axis of rotation;
a first motor output shaft rotatable about said first longitudinal axis of rotation and directly coupled to said first gear set; and
a second motor output shaft rotatable about said second longitudinal axis of rotation and directly coupled to said second gear set such that said first and second longitudinal axes of rotation intersect said lateral axis of rotation.

* * * * *

UNITED STATES PATENT AND TRADEMARK OFFICE
CERTIFICATE OF CORRECTION

PATENT NO.        : 7,083,015 B2
APPLICATION NO.   : 09/781795
DATED             : August 1, 2006
INVENTOR(S)       : Ruppert et al.

It is certified that error appears in the above-identified patent and that said Letters Patent is hereby corrected as shown below:

Claim 10, Column 6, Line 16: "alone" should be --along--.

Claim 8, Column 8, Line 8: Please insert "The" before Assembly.

Claim 27, Column 9, Line 33: "rear" should be --gear--.

Signed and Sealed this

Twenty-first Day of November, 2006

JON W. DUDAS
*Director of the United States Patent and Trademark Office*